(12) United States Patent
Shirokoshi et al.

(10) Patent No.: US 10,823,259 B2
(45) Date of Patent: Nov. 3, 2020

(54) STRAIN WAVE GEARING HAVING 3-DIMENSIONAL MESHING TOOTH PROFILE

(71) Applicant: HARMONIC DRIVE SYSTEMS INC., Tokyo (JP)

(72) Inventors: Norio Shirokoshi, Azumino (JP); Yuya Murayama, Azumino (JP); Yoshitomo Mizoguchi, Azumino (JP); Satoshi Kishi, Azumino (JP)

(73) Assignee: Harmonic Drive Systems Inc., Tokyo (JP)

(*) Notice: Subject to any disclaimer, the term of this patent is extended or adjusted under 35 U.S.C. 154(b) by 0 days.

(21) Appl. No.: 16/476,587

(22) PCT Filed: Oct. 19, 2017

(86) PCT No.: PCT/JP2017/037854
§ 371 (c)(1),
(2) Date: Jul. 9, 2019

(87) PCT Pub. No.: WO2019/077719
PCT Pub. Date: Apr. 25, 2019

(65) Prior Publication Data
US 2019/0368576 A1 Dec. 5, 2019

(51) Int. Cl.
*F16H 1/32* (2006.01)
*F16H 55/17* (2006.01)
*F16H 57/08* (2006.01)

(52) U.S. Cl.
CPC ............. *F16H 1/32* (2013.01); *F16H 55/17* (2013.01); *F16H 57/08* (2013.01)

(58) Field of Classification Search
CPC ............. F16H 1/32; F16H 55/17; F16H 57/08
See application file for complete search history.

(56) References Cited

U.S. PATENT DOCUMENTS

2010/0000357 A1 1/2010 Gutmann et al.
2011/0245006 A1* 10/2011 Negishi .................. H02K 7/116
475/149

(Continued)

FOREIGN PATENT DOCUMENTS

JP S4541171 B 12/1970
JP S63115943 A 5/1988
(Continued)

OTHER PUBLICATIONS

International Search Report (with English translation) and Written Opinion issued in corresponding International Patent Application No. PCT/JP2017/037854, 7 pages (dated Jan. 16, 2018).

*Primary Examiner* — David J Hlavka
(74) *Attorney, Agent, or Firm* — Buchanan Ingersoll & Rooney PC

(57) ABSTRACT

A strain wave gearing wherein the tooth profile of an external teeth of a cup-shaped or silk-hat-shaped external gear is set as follows. The tooth-tip tooth thickness decreases gradually from an external-teeth outer end toward an external-teeth inner end along an external tooth trace direction. In addition, a pressure angle at a pitch point (P) increases gradually from the external-teeth outer end toward the external-teeth inner end along the external tooth trace direction. Thus, it is possible to realize a cup-type or silk-hat-type strain wave gearing in which external teeth mesh with internal teeth in a wide range along the tooth trace direction, rather than only in one cross-section perpendicular to the axis in the tooth trace direction.

4 Claims, 5 Drawing Sheets

(56) References Cited

U.S. PATENT DOCUMENTS

| | | | |
|---|---|---|---|
| 2017/0343094 A1* | 11/2017 | Tsai | F16H 49/001 |
| 2018/0149256 A1* | 5/2018 | Sakata | B21D 22/28 |
| 2018/0257141 A1* | 9/2018 | Hofmann | F16H 55/06 |
| 2019/0264791 A1* | 8/2019 | Atmur | F16H 55/0833 |
| 2019/0312485 A1* | 10/2019 | Okamura | H02K 7/116 |
| 2019/0316653 A1* | 10/2019 | Yoshida | F16C 19/28 |
| 2020/0003256 A1* | 1/2020 | Koroyasu | F16H 1/00 |

FOREIGN PATENT DOCUMENTS

| | | | |
|---|---|---|---|
| JP | H6479448 | A | 3/1989 |
| JP | H05209655 | A | 8/1993 |
| JP | 2008525727 | A | 7/2008 |
| JP | 2017044287 | A | 3/2017 |
| JP | 2017067266 | A | 4/2017 |

* cited by examiner

STRAIN WAVE GEARING HAVING 3-DIMENSIONAL MESHING TOOTH PROFILE

TECHNICAL FIELD

The present invention relates to a cup-type or silk-hat-type strain wave gearing. More specifically, the present invention pertains to a strain wave gearing having 3-dimensional meshing tooth profile, in which a predetermined meshing state is maintained not only in one axis-perpendicular cross-section but also even in the other axis-perpendicular cross-sections along the tooth trace direction.

BACKGROUND ART

A cup-type or silk-hat-type strain wave gearing has a rigid internally toothed gear, a cup-shaped or silk-hat-shaped flexible externally toothed gear coaxially arranged inside the internally toothed gear, and a wave generator fitted into the externally toothed gear. The externally toothed gear is provided with a flexible cylindrical body, a diaphragm extending radially from the rear end of the cylindrical body, and external teeth formed on an outer circumferential surface portion at the open-end side of the cylindrical body. The externally toothed gear is made to flex by the wave generator into an elliptical shape, and is meshed with the internally toothed gear on both ends in the major-axis direction of the elliptical shape.

In Patent document 1, it is proposed a basic tooth profile defined by an involute tooth profile. In Patent documents 2 and 3, it is proposed a tooth profile design method for deriving addendum tooth profiles of an internally toothed gear and an externally toothed gear for wide-area contact, using a process of approximating meshing of the two gears by rack meshing.

The externally toothed gear is flexed into an elliptical shape, the flexion amount of which increases from an external-teeth inner end at the side of the diaphragm toward an external-teeth outer end at the side of the open end, the flexion amount being approximately proportional to the distance measured from the diaphragm. Further, each portion of the external teeth of the externally toothed gear is repeatedly flexed in the radial direction while the wave generator rotates. In this way, the flexing state of the external teeth of the externally toothed gear differ in each position along the tooth trace direction, and therefore the meshing state thereof with the internal teeth of the internally toothed gear also differ along the tooth trace direction. Even if a tooth profile of the external teeth is set so that a continuous meshing state is established with respect to the internal teeth in one axis-perpendicular cross section in the tooth trace direction of the external teeth, an appropriate meshing state cannot be obtained in another cross-sectional position in the tooth trace direction.

In Patent document 4, a straight tooth profile is adopted for the tooth profile of external teeth, and tooth surfaces on both sides thereof are defined by inclined surfaces that are inclined along the tooth trace direction so as to increase the tooth thickness from the diaphragm-side end toward the open-side end of the externally toothed gear. This prevents the tooth tip of the external teeth at the diaphragm side from interfering with the tooth tip of the internal teeth in meshing operation of the external and internal teeth.

PRIOR ART DOCUMENTS

Patent Documents

Patent document 1: JP 45-41171 B
Patent document 2: JP 63-115943 A
Patent document 3: JP 64-79448 A
Patent document 4: JP 2017-44287 A

SUMMARY OF THE INVENTION

Problems to be Solved by the Invention

In a cup-type or a silk-hat-type strain wave gearing, a movement locus of meshing motion of the external teeth, which is repeatedly flexed, is different in each position along the tooth trace direction of the external teeth. When the tooth thickness thereof is made to decrease toward the diaphragm side from the open-end side, it is possible to prevent the external teeth from interfering with the tip of the internal teeth or from making an uneven contact state with the internal teeth. It is, however, not possible to achieve a meshing (3-dimensional meshing) of the external teeth with the internal teeth in a wide range along the tooth trace direction in addition to a meshing (2-dimensional meshing) in one axis-perpendicular cross-section in the tooth trace direction.

It is an object of the present invention to provide a cup-type or silk-hat-type strain wave gearing having 3-dimensional meshing tooth profile, which is able to realize not only a meshing of gears in one axis-perpendicular cross-section in the tooth trace direction but also a mashing thereof in a wide range along the tooth trace direction.

Means of Solving the Problems

In a cup-type or silk-hat-type strain wave gearing according to the present invention, internal teeth of an internally toothed gear have the same tooth profile in each position along the tooth trace direction of the internal teeth. External teeth of an externally toothed gear have a tooth profile configured as follows. The external teeth have a tooth-tip tooth thickness that decreases from the external-teeth outer end at the open-end side of the external teeth toward the external-teeth inner end at the diaphragm side thereof along the tooth trace direction. Further, the external teeth have a pressure angle at a pitch point thereof, the pressure angle gradually increasing from the external-teeth outer end toward the external-teeth inner end along the tooth trace direction. It is possible for the tooth-bottom tooth thickness of the external teeth to be constant at each position along the tooth trace direction of the external teeth. Alternatively, the tooth-bottom tooth thickness of the external teeth may be gradually decreased from the external-teeth outer end toward the external-teeth inner end.

The tooth-top tooth thickness can be made to decrease in a linear manner, or a concave curvilinear or a convex curvilinear manner along the tooth trace direction of the external teeth. The tooth depth of the external teeth may be varied gradually along the tooth trace direction.

In the present invention, based on a movement locus of meshing motion of the external teeth with respect to the internal teeth in each axis-perpendicular cross-section along the tooth trace direction, the addendum-side tooth profile of the external teeth is configured so as to gradually decrease in thickness toward the diaphragm side, and the pressure angle thereof is configured so as to gradually increase toward the diaphragm side. In other words, each tooth surface of the external teeth inclines in a direction approaching to the other tooth surface thereof toward the diaphragm side along the tooth trace direction, and the amount of inclination of the tooth surfaces in the tooth depth direction gradually increases toward the diaphragm side.

For example, in an axis-perpendicular cross-section (principal cross-section) that is set at a predetermined position along the tooth trace direction, tooth profiles for the external teeth and the internal teeth are determined to form an appropriate meshing therebetween. The tooth profile of the internal teeth is set to be the same along the tooth trace direction. The tooth profile of the external teeth at each position along the tooth trace direction of the external teeth is modified in accordance with the flexion amount at each corresponding position along the tooth trace direction thereof. Specifically, the tooth-tip tooth thickness of the external teeth is made to gradually decrease from the external-teeth outer end toward the external-teeth inner end along the tooth trace direction of the external teeth. Further, the pressure angle at the pitch point is made to increase from the external-teeth outer end toward the external-teeth inner end along the tooth trace direction of the external teeth.

According to the present invention, the tooth surface of the external teeth varies in inclination state in two directions from the external-teeth outer end toward the external-teeth inner end along the tooth trace direction. Thus, it is possible to avoid interference of the tooth tip of the external teeth at the diaphragm side with the tooth tip of the internal teeth, and at the same time it is also possible to establish a wide-range meshing state between the both teeth along the tooth trace direction rather than only in the one position along the tooth trace direction. Because the both teeth mesh with each other in an appropriate manner in each position along the tooth trace direction, it is possible to increase the load capacity of the strain wave gearing and enhance the reliability thereof during a high load operation.

BRIEF DESCRIPTION OF THE DRAWINGS

FIG. 2 includes explanatory views illustrating the flexing state of a cup-shaped and silk-hat-shaped externally toothed gears, in which FIG. 2(a) illustrates a state before deformation, FIG. 2(b) illustrates a state of a cross-section including the major axis of the externally toothed gear after elliptically deformed, and FIG. 2(c) illustrates a state of a cross-section including the minor axis of the externally toothed gear after elliptically deformed;

MODE FOR CARRYING OUT THE INVENTION

Figure 1:
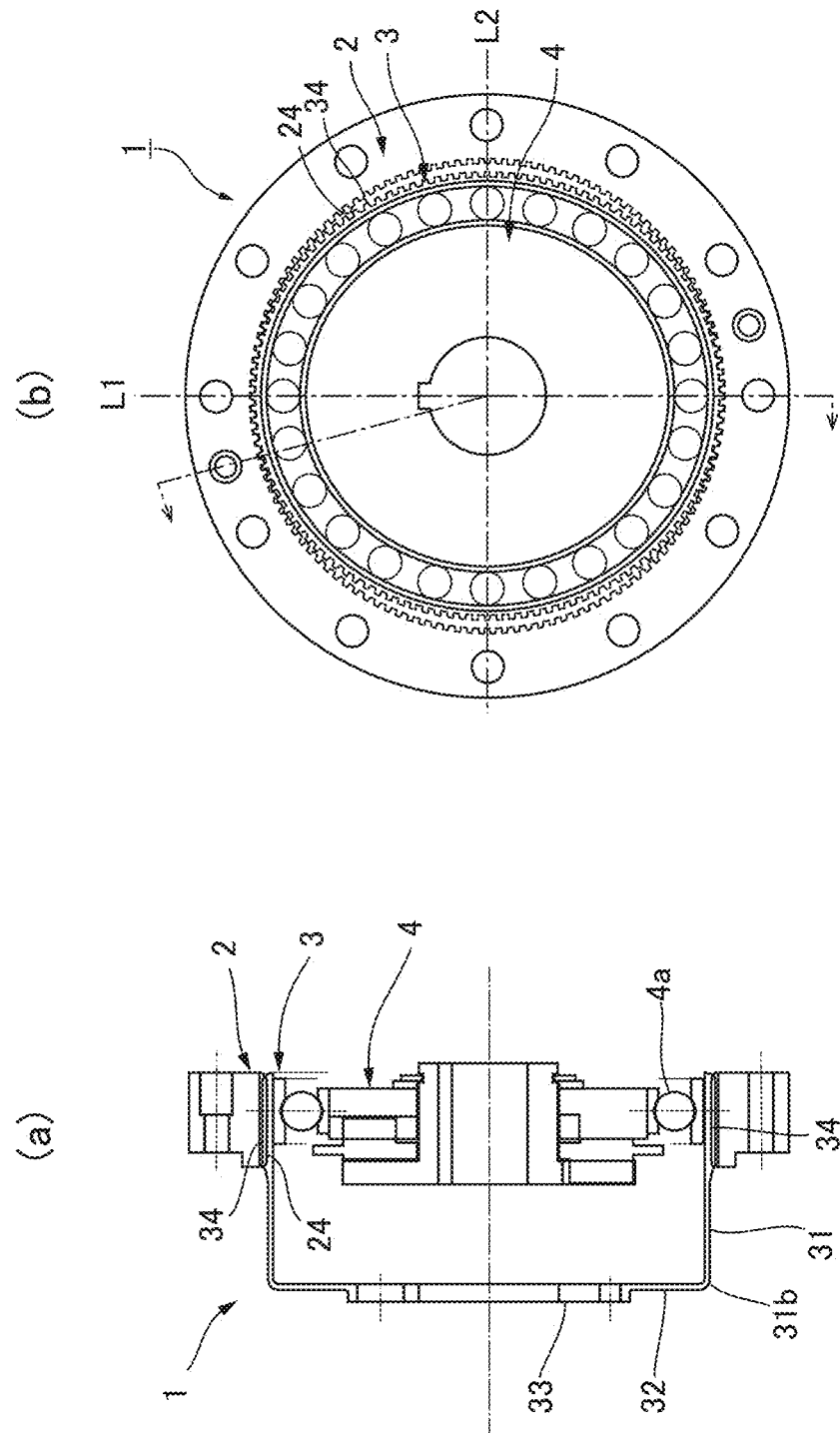
FIG. 1(a) is a longitudinal cross-sectional view and FIG. 1(b) is a front view of a cup-type strain wave gearing.

A strain wave gearing according to the present invention will be explained with reference to the drawings. FIG. 1(a) is a longitudinal cross-sectional view illustrating an example of a cup-type strain wave gearing according to the present invention, and FIG. 1(b) is a front view thereof.

The strain wave gearing 1 has a circular rigid internally toothed gear 2, a flexible externally toothed gear 3 coaxially arranged inside the internally toothed gear, and a wave generator 4 fitted into the externally toothed gear, the wave generator having an elliptical contour. The internally toothed gear 2 and the externally toothed gear 3 are spur gears having the same module (m). The difference in number of teeth between the both gears is 2n (n is a positive integer), and the number of teeth of the internally toothed gear 2 is larger. The external teeth 34 of the externally toothed gear 3 is made to flex into an elliptical shape by the wave generator 4 having the elliptical contour and is meshed with internal teeth 24 of the internally toothed gear 2 on both end portions in the direction of the major axis L1 of the elliptical shape.

When the wave generator 4 rotates, the meshing positions between the both gears 2 and 3 move in the circumferential direction so that relative rotation occurs between the both gears 2 and 3 in accordance with the difference in number of teeth between the gears. The externally toothed gear 3 is provided with a flexible circular body 31; a diaphragm 32 continuous from one end that is a rear end 31b of the cylindrical body, and extending therefrom in the radial direction; a rigid annular boss 33 continuous from the diaphragm 32; and the external teeth 34 formed on an outer circumferential surface portion of the cylindrical body 31 at the side of the other end (front end) that is an open end 31a of the cylindrical body.

The wave generator 4 is fitted into the inner circumferential surface of the external-teeth forming portion of the cylindrical body 31, whereby the flexion amount of the cylindrical body 31 in a radially inward or radially outward direction is gradually increased from the rear end 31b at the diaphragm side toward the open end 31a.

Figure 2:
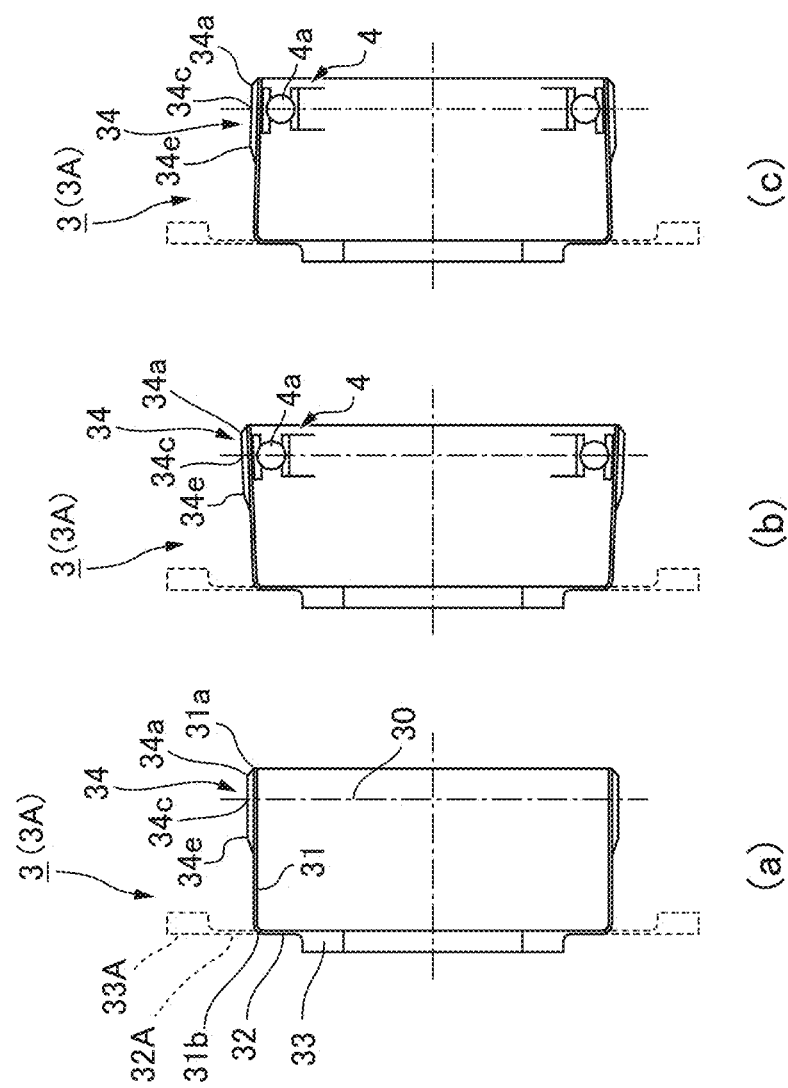

FIG. 2 illustrates a cross-section of the cup-shaped externally toothed gear 3 in an elliptically flexed state, the cross-section including the axis of the externally toothed gear, in which FIG. 2(a) illustrates a state before deformation, FIG. 2(b) illustrates a cross-section including the major axis of the elliptical curve after deformation, and FIG. 2(c) illustrates a cross-section including the minor axis of the elliptical curve after deformation. In FIGS. 2(a) to 2(c), dotted lines illustrate a silk-hat-shaped externally toothed gear 3A. The silk-hat-shaped externally toothed gear 3A has the cylindrical body 31, from the rear end 31b of which a diaphragm 32A extends radially and outward, and an annular boss 33A is formed on the outer circumferential end of the diaphragm. The flexing state of the external-teeth forming portion of the externally toothed gear 3A is the same as that of the cup-shaped externally toothed gear 3.

The flexion amount in the radially outward direction is gradually increased in proportion to the distance measured from the rear end 31b toward the open end 31a in the cross-section including the major axis L1 of the elliptical curve as illustrated in FIG. 2(b), while the flexion amount in the radially inward direction is gradually increased in proportion to the distance from the rear end 31b toward the open end 31a in the cross-section including the minor axis L2 of the elliptical curve. Accordingly, the flexion amount of the external tooth 34 formed on the outer circumferential surface portion at the open end 31a side, varies in each axis-perpendicular cross-section along the tooth trace direction thereof. Specifically, the flexion amount is gradually increased from the external-teeth inner end 34e at the diaphragm side toward the external-teeth outer end 34a at the open end 31a side along the tooth trace direction of the external teeth 34, the flexion amount being in proportion to the distance from the rear end 31b.

Figure 3:
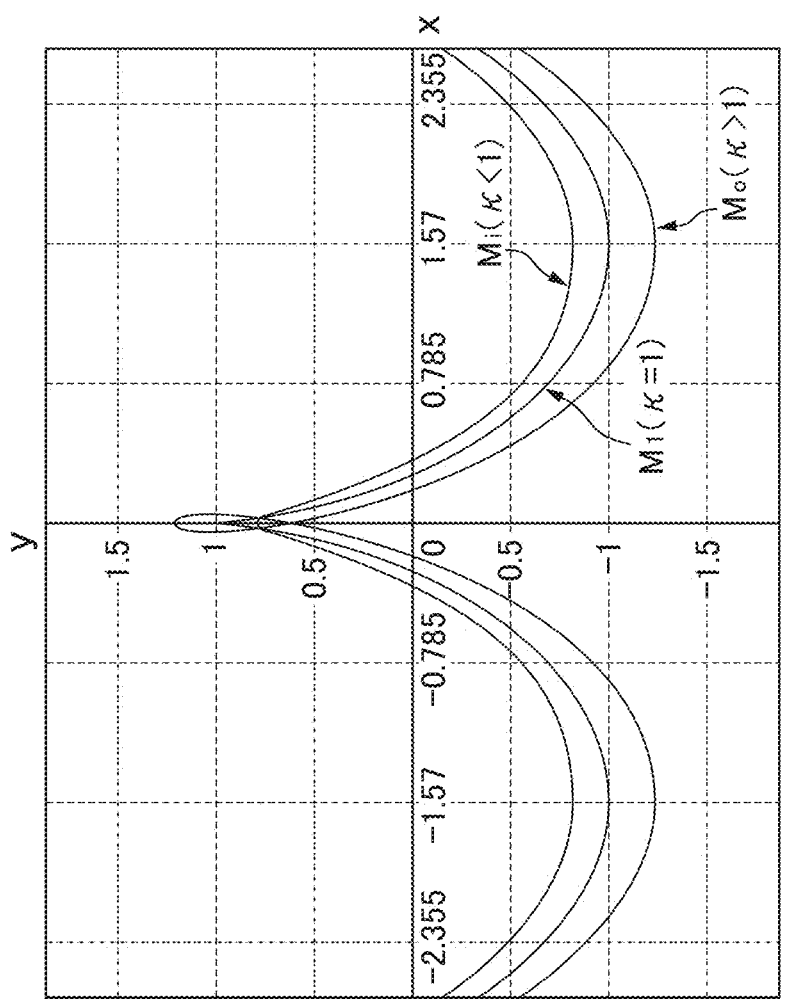
FIG. 3 is a diagram illustrating an example of movement loci obtained when a relative motion of the both gears is rack approximated in an arbitrary axis-perpendicular cross-section of the tooth profile along the tooth trace direction.

FIG. 3 illustrates movement loci of the external teeth 34 of the externally toothed gear 3 with respect to the internal teeth 24 of the internally toothed gear 2, the movement loci being obtained when the relative motion of the teeth of the both gears 2 and 3 of the strain wave gearing 1 is rack approximated. In this drawing, x axis indicates the direction of translation of the rack, and y axis indicates a direction perpendicular thereto. The flexion amount of the elliptical rim neutral line of the external teeth 34 with respect to the rim neutral circle before the external teeth 34 is deformed into an elliptical shape is 2 κmn on a position of the major axis, where κ is a flexion coefficient.

The origin of the y axis in FIG. 3 is set to be an average position of the amplitude of the movement loci. Among the movement loci, a non-deviation movement locus M1 is obtained in the case of no-deviation standard flexing state in which the flexion coefficient κ=1, a positive-deviation movement locus Mo is obtained in the case of positive-deviation flexing state in which the flexion coefficient κ>1, and a negative-deviation movement locus Mi is obtained in the case of negative-deviation flexing state in which the flexion coefficient κ<1. For example, an axis-perpendicular cross-section at a midway position in the tooth trace direction of the external teeth is referred to as a principal cross-section, which is, for example, a position passing through the center of ball 4a of a wave bearing. The flexion amount of the externally toothed gear is determined so that the non-deviation movement locus, in which the flexion coefficient K equals 1, is obtained in the principal cross-section.

(Tooth Profiles of the Both Teeth)

Figure 4:
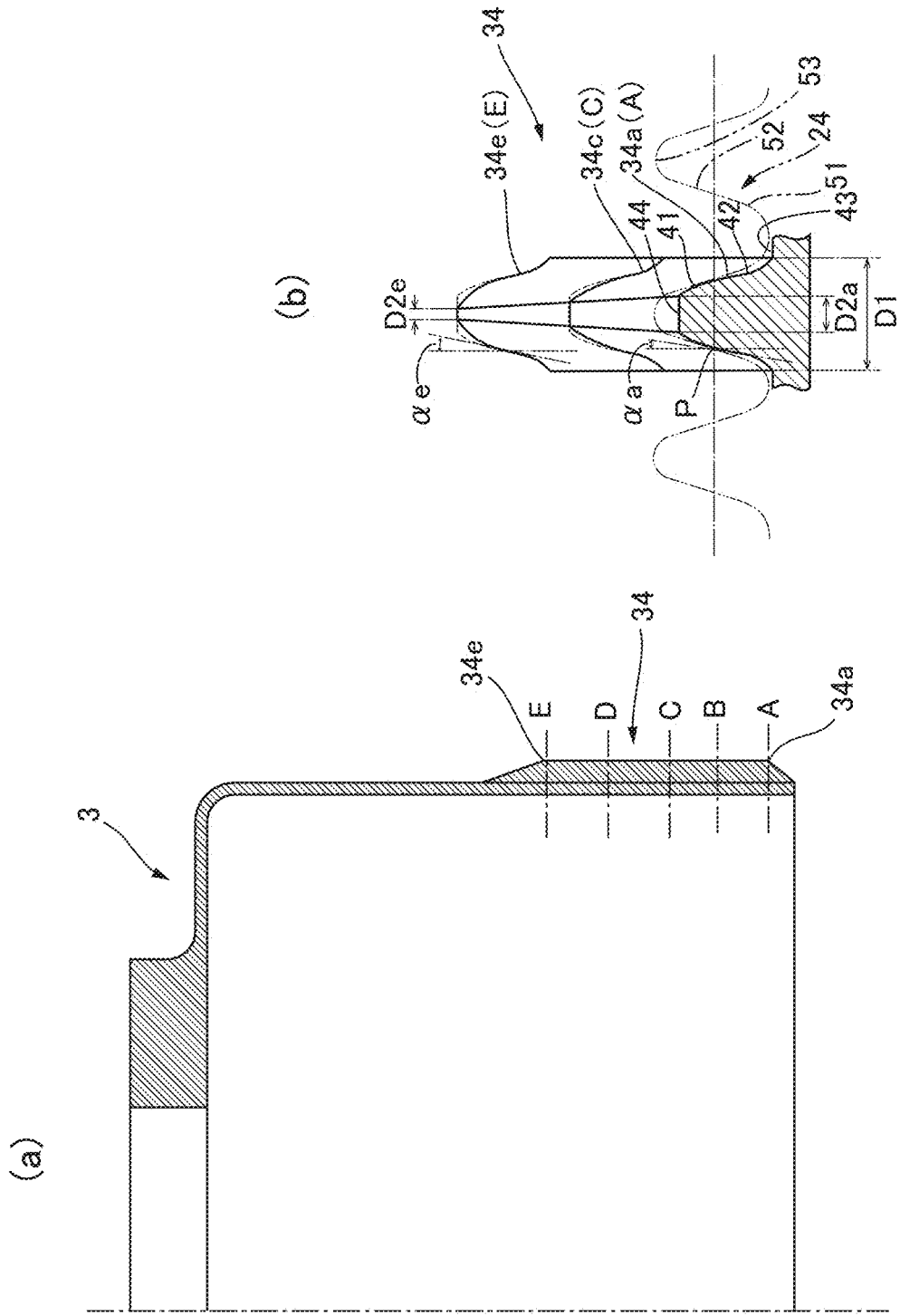
FIG. 4 includes both an explanatory view in FIG. 4(a) illustrating respective positions along the tooth trace direction of the external tooth, and an explanatory view in FIG. 4(b) illustrating tooth profiles in the respective positions along the tooth trace direction thereof.
Figure 5:
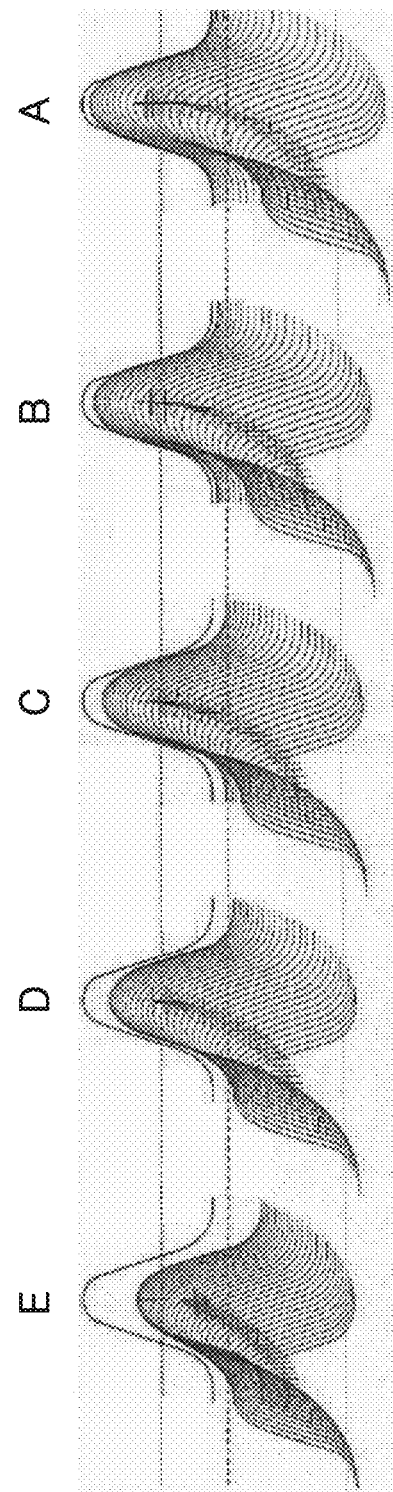
FIG. 5, including parts A, B, C, D, and e, is an explanatory view illustrating a state of meshing of the tooth profile of the external teeth with the tooth profile of the internal teeth, in which states in five positions between the external-teeth outer end at the open-end side and the external-teeth inner end at the diaphragm side are illustrated.

FIG. 4(a) is an explanatory view illustrating respective positions in the tooth trace direction of the external tooth 34 of the externally toothed gear 3, and FIG. 4(b) is an explanatory view illustrating tooth profiles of the internal teeth 24 and the external teeth 34. FIG. 5 is an explanatory view illustrating a state of meshing motion of the external teeth 34 with respect to the internal teeth 24 at each of the respective positions A to E of the external teeth 34.

The tooth profile of the internal teeth 24 is the same along the tooth trace direction thereof. In an example, the tooth profile of the internal teeth 24 is defined by an addendum tooth profile portion 51, a dedendum tooth profile portion 52 continuous from the addendum tooth profile portion, and a tooth bottom portion 53 continuous from the dedendum tooth profile portion, in which the addendum tooth profile portion is formed by a convex-curvilinear tooth profile portion and a straight tooth profile portion, and the dedendum tooth profile portion is formed by a strain tooth profile portion and a concave-curvilinear tooth profile portion.

The tooth profile of the external teeth 34 is set as follows. In an example, the tooth profile thereof at the external-teeth outer end 34a in the tooth trace direction is defined by a convex-curvilinear addendum tooth profile portion 41, a concave-curvilinear dedendum tooth profile portion 42 smoothly connected to the addendum tooth profile, and a tooth bottom portion 43 smoothly connected to the dedendum tooth profile portion. The tooth tip of the external teeth 34 is formed with a flat tooth tip surface 44 to secure a clearance between the internal teeth 24.

The tooth profile of each portion of the external teeth 34 from the external-teeth outer end 34a to the external-teeth inner end 34e is determined as follows. The external teeth 34 has a tooth-bottom tooth thickness D1 which is set to be the same at each position in the tooth trace direction of the external teeth. The external teeth 34 has a tooth-tip tooth thickness which gradually decreases linearly from the external-teeth outer end 34a toward the external-teeth inner end 34e along the tooth trace direction of the external teeth (in other words, the width of the tooth tip surface 44 is gradually decreased), so that the tooth thickness D2a at the external-teeth outer end 34a is the largest and the tooth thickness D2e at the external-teeth inner end 34e is the smallest. Further, the pressure angle at the pitch point P gradually increases from the external-teeth outer end 34a toward the external-teeth inner end 34e along the tooth trace direction of the external teeth, so that the pressure angle αa at the external-teeth outer end 34a is the smallest and the pressure angle αe at the external-teeth inner end 34e is the largest.

Although the tooth-bottom tooth thickness D1 is constant, it can also be set so as to gradually decrease from the external-teeth outer end 34a toward the external-teeth inner end 34e. For example, the tooth-bottom tooth thickness D1 may be decreased in a linear state or in a convex-curvilinear or a concave-curvilinear state along the tooth trace direction. Similarly, the tooth-tip tooth thickness may be gradually decreased in a convex-curvilinear or a concave-curvilinear state along the tooth trace direction. It is also possible for the tooth depth of the external teeth 34 to be varied along the tooth trace direction.

In an example, the tooth profiles for the external teeth 34 and internal teeth 24, which are capable of performing continuous meshing between these teeth, are determined at the position C of the principle cross-section (at the position of the ball center) in the tooth trace direction. For example, as is described in Patent document 2 (JP 63-115943 A) and Patent document 3 (JP 64-79448 A) which are referred to hereinbefore, a curve portion is derived from a movement locus of the external tooth obtained by rack approximation, the curve portion being a certain range of the movement locus from a meshing limit point thereof, a similarity curve of the curve portion is employed to define the principal tooth profiles of the both teeth. The tooth profile of the internal teeth 24 is set to be the same along the tooth trace direction. The tooth profile of the external teeth 34 at each position along the tooth trace direction is modified in accordance with the flexion amount of the external teeth 34 at each corresponding position along the tooth trace direction. Specifically, the tooth-tip tooth thickness of the external tooth is made to gradually decrease from the external-teeth outer end 34a toward the external-teeth inner end 34e along the tooth trace direction of the external tooth. Also, the pressure angle at the pitch point P of the external teeth 34 is made to gradually increase from the external-teeth outer end 34a toward the external-teeth inner end 34e along the tooth trace direction of the external teeth.

Although the above example relates to a cup-type strain wave gearing, the present invention can also be applied to a silk-hat-type strain wave gearing in the similar manner.

The invention claimed is:

1. A strain wave gearing having 3-dimensional meshing tooth profile comprising:
   a rigid internally toothed gear; a flexible externally toothed gear coaxially arranged inside the internally toothed gear; and a wave generator fitted into the externally toothed gear,
   wherein the externally toothed gear has a flexible cylindrical body; a diaphragm extending in a radial direction from a rear end of the cylindrical body; and external teeth formed on an outer circumferential surface portion on a side of a front end of the cylindrical body, the front end being an open end, the cylindrical body of the externally toothed gear is flexed into an elliptical shape by the wave generator, and the external teeth are meshed with internal teeth of the internally toothed gear on both ends in a direction of a major axis of the elliptical shape, a flexion amount of the external teeth increases from an external-teeth inner end at a side of the diaphragm toward an external-teeth outer end at a side of the open end along a tooth trace direction of the external teeth, the flexion amount being in approximate proportion to a distance measured from the diaphragm, the internal teeth have a tooth profile that is a same at each position along a tooth trace direction of the internal teeth, and the external teeth have a tooth profile configured so that:

a tooth-tip tooth thickness thereof gradually decreases from the external-teeth outer end toward the external-teeth inner end along the tooth trace direction of the external teeth; and a pressure angle at a pitch point thereof gradually increases from the external-teeth outer end toward the external-teeth inner end along the tooth trace direction of the external teeth.

2. The strain wave gearing having 3-dimensional meshing tooth profile according to claim 1, wherein the external teeth have a tooth-bottom tooth thickness, the tooth-bottom tooth thickness being constant at each position along the tooth trace direction of the external teeth, or the tooth-bottom tooth thickness being gradually decreased from the external-teeth outer end toward the external-teeth inner end.

3. The strain wave gearing having 3-dimensional meshing tooth profile according to claim 1, wherein the external teeth have a tooth-tip tooth thickness that decreases in a linear manner or in a concave-curvilinear or a convex-curvilinear manner along the tooth trace direction of the external teeth.

4. The strain wave gearing having 3-dimensional meshing tooth profile according to claim 1, wherein the external teeth have a tooth depth that varies along the tooth trace direction of the external teeth.

* * * * *